Dec. 11, 1923.
G. CANNING
1,477,031
AUTOMOBILE ROBE HOLDER
Filed Nov. 29, 1922
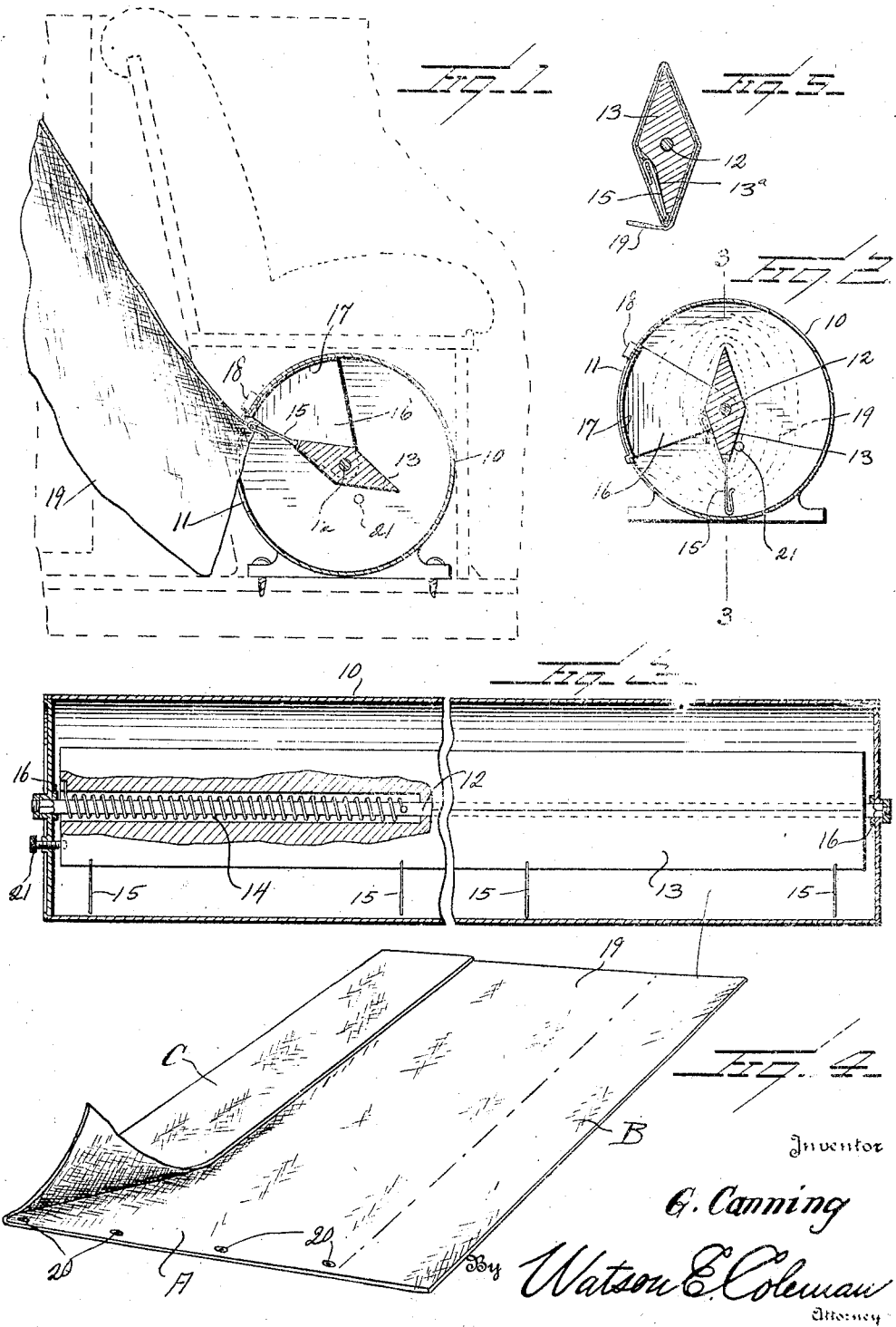
Inventor
G. Canning
By Watson E. Coleman
Attorney Patented Dec. 11, 1923.

1,477,031

UNITED STATES PATENT OFFICE.

GEORGE CANNING, OF LOS ANGELES, CALIFORNIA.

AUTOMOBILE ROBE HOLDER.

Application filed November 29, 1922. Serial No. 603,966.

*To all whom it may concern:*

Be it known that I, GEORGE CANNING, a citizen of the United States, residing at Los Angeles, in the county of Los Angeles and State of California, have invented certain new and useful Improvements in Automobile Robe Holders, of which the following is a specification, reference being had to the accompanying drawings.

This invention relates to automobile attachments, and particularly to means for holding a robe within an automobile, carriage or other vehicle in a compact and rolled up condition.

The general object of the invention is to provide an automobile robe holder comprising a casing having a spring roller mounted therein so that the robe may be withdrawn from the casing whenever desired to be used and may be rolled up within the casing whenever it is not in use, said casing protecting the robe against dust, dirt and from theft.

A further object is to provide a device of this character having a door adapted to close over the opening in the casing and be locked in its closed position.

A still further object is to so construct the casing and the robe that a relatively wide robe may be used which may be folded up for insertion within the casing, this robe being longer than the casing so that it may be folded in around the legs of the user.

Other objects will appear in the course of the following description.

My invention is illustrated in the accompanying drawings, wherein:—

Figure 1 is a vertical sectional view through my robe holder, showing the same applied beneath an automobile seat, the seat being shown in dotted lines;

Figure 2 is a vertical section transverse to Figure 1;

Figure 3 is a longitudinal vertical section of the holder the roller being partially in section;

Figure 4 is a perspective view of the robe;

Figure 5 is a fragmentary view showing the roller 13 recessed to receive the hooks 15;

Referring to these drawings, 10 designates a circular casing closed at its ends and having a longitudinally extending opening 11 whose length is nearly equal to that of the casing. Disposed within this casing and mounted upon a shaft 12 is a roller 13, this roller being preferably approximately diamond-shaped in cross section. This roller is caused to rotate in one direction by means of a spring 14 operating on the roller in a common and well known manner so that the spring resists rotation of the roller in one direction, and when rotative strain upon this roller is relieved the spring will rotate it in the opposite direction.

This roller is provided along one margin or along a line on its periphery with a plurality of pivoted hooks 15, these hooks being pivoted so that the hooks may swing against one of the faces of the diamond-shaped roller. Pivoted upon the extremities of the shaft 12 are segmental arms 16 carrying a longitudinally extending door or gate 17 curved to conform to the curvature of the inner face of the casing and of such width that the door will close the opening 11 when swung downward. This door is provided with a locking device 18 of any suitable character so that the door may be locked closed and thus the robe or rug be prevented from being stolen.

The robe 19 has an extreme width greater than that of the casing or of the roller. The middle portion of the robe is provided with a plurality of perforations 20 or eyes through which the hooks 15 engage the robe. The perforations 20 are disposed along the margin of the robe a distance nearly equal to the length of the roller and slightly less than the length of the opening 11 so that when it is desired to house the robe 19 within the casing the side portions B and C are folded over upon the portion A, as indicated in dotted lines, and then the folded robe is rolled up upon the roller 13. After the robe has been pulled out from the roller, as illustrated in Figure 3, and has entirely cleared the wall of the opening 11, then the robe may be unfolded. It will be seen that the relatively long hooks 15 which are pivoted to the roller permit the robe to be entirely withdrawn from within the casing.

The casing is to be mounted in any suitable manner and installed, for instance, under the front seat if the robe is to be used for the back seat, and any suitable means may be used for mounting the casing beneath the front seat. With this construction the robe can be entirely detached from the hooks 15 so that the robe may be cleaned and to permit the cleaning of the cabinet. Preferably the roller will also be made removable. Preferably, though not necessarily, the casing will be built as part of the car, though it is obvious that it might be built in the form of an attachment to be applied to cars already built. I have found that a roller diamond-shaped in cross section is the most effective form of roller upon which the robe can be wound, as more of the robe may be drawn in in one revolution of a diamond-shaped roller than is possible with a round roller. Furthermore, the tension of the spring is not all used up when the robe is in place as is the case with a circular roller. Furthermore, the diamond-shaped roller provides facets against which the hooks 15 may swing so that there will be practically no protuberance on the roller which will interfere with the proper winding up of the robe thereon.

In order to prevent the roller from turning in an unwinding direction under the influence of the spring until the spring is completely slack when the robe is taken off the roller, I have provided a set screw 21 passing through one end of the casing and adapted to engage the roller and prevent its rotation in one direction under the action of the spring. This will hold the spring tensioned when the robe is taken off the roller or disengaged from the hooks 15. When the robe is engaged with these hooks and it is desired to wind up the robe, obviously the set screw will be turned outward, which will permit the roller to wind up under the action of the spring. This set screw 21 also acts to prevent the constant tendency of the roller to wind up the robe when the robe is in use. I do not wish to be limited to a set screw, as any suitable holding device might be provided for this purpose.

The roller 13 may be recessed longitudinally at 13ª to accommodate the hooks 15 and the edge of the robe so that these hooks will come flush with the face of the roller 13 when the robe is rolled or partly rolled to prevent marring of the robe, as shown in Figure 5. While I have illustrated a set screw 21 for the purpose of holding the roller from reverse rotation when desired, it is obvious that pawls may be provided such as are used on window shade rollers for the purpose of preventing such reverse rotation, and in that case a pull upon the robe will release the pawls, the spring 14 will then act to roll up the roller 13 and the robe to any desired amount, and then the pawls will again fall in engagement with the rollers or with the ratchet teeth carried upon the ends of the rollers and will hold the rollers from rotation under the action of the spring 14. In this case the rollers 13 will act in the same manner as the rollers of the ordinary window shade.

Obviously I do not wish to be limited to the exact details of construction or the exact arrangement of parts illustrated, as many changes might be made in these details and arrangements without departing from the spirit of the invention as defined in the appended claims.

I claim:—

1. A robe holder for automobiles comprising a casing approximately circular in cross section, closed at the ends, and having a longitudinally extending opening, a spring actuated roller mounted within said casing, the roller being approximately diamond-shaped in cross section, a plurality of hooks pivoted along one edge of the roller, the roller being recessed on one face to accommodate said hooks when the hooks are turned back into parallel relation to the recessed face of the roller, and a robe having one margin thereof formed with eyes detachably engaged with said hooks.

2. A robe holder for automobiles comprising a casing approximately circular in cross section, a spring actuated roller mounted within the casing, the roller being approximately diamond-shaped in cross section, hooks pivoted along one edge of the roller, the casing having a longitudinally extending opening, and a robe detachably engaged by said hooks.

3. A robe holder for automobiles comprising a casing approximately circular in cross section, a spring actuated roller mounted within the casing, the roller being approximately diamond-shaped in cross section, hooks pivoted along one edge of the roller, the casing having a longitudinally extending opening, a door adapted to close said opening and be locked in closed position, and a robe having a width greater than the length of the casing and having its middle portion formed with eyes with which said hooks have detachable engagement, the ends of the robe being adapted to be folded over upon the middle of the robe to permit the robe to be inserted within the casing.

4. A robe holder for automobiles comprising a cylindrical casing closed at its ends and having a longitudinally extending opening, a spring roller mounted within the opening, the roller being approximately diamond-shaped in cross section and having hooks pivoted to one edge thereof, a shaft upon which the roller is mounted, a curved door adapted to move concentrically to said shaft and normally close said opening and having means for locking it in its closed position, the ends of the door having inwardly extending arms pivoted for movement around said shaft as an axis.

5. A robe holder for automobiles comprising a cylindrical casing closed at its ends and having a longitudinally extending opening, a spring roller mounted within the opening, a curved door adapted to move concentrically to the axis of rotation of said roller and normally closing said opening and having means for locking it in its closed position, the ends of the door having inwardly extending arms pivoted for movement around the axis of the roller, and a robe detachably engaged with the spring roller.

In testimony whereof I hereunto affix my signature.

GEO. CANNING.